United States Patent [19]
Fulton

[11] Patent Number: 5,970,921
[45] Date of Patent: Oct. 26, 1999

[54] MULTI-FUNCTION PET COLLAR

[76] Inventor: Karen H. Fulton, P.O. Box 25911, Raleigh, N.C. 27611

[21] Appl. No.: 09/110,171

[22] Filed: Jul. 6, 1998

[51] Int. Cl.$^6$ .................................................. A62B 35/00
[52] U.S. Cl. ......................... 119/858; 119/792; 54/79.1; 54/79.2
[58] Field of Search ................................... 119/858, 792; 283/74; 54/79.2, 79.1, 79.4

[56] References Cited

U.S. PATENT DOCUMENTS

| | | | |
|---|---|---|---|
| D. 281,028 | 10/1985 | Nichols | D30/37 |
| D. 337,864 | 7/1993 | Cullington et al. | 54/79 |
| 3,141,443 | 7/1964 | Huey | 119/143 |
| 3,999,521 | 12/1976 | Puiello | 119/96 |
| 5,003,756 | 4/1991 | Mazzotta, Sr. | 54/79 |
| 5,060,458 | 10/1991 | Curtis | 54/79 |
| 5,144,913 | 9/1992 | Yasul | 119/106 |
| 5,355,839 | 10/1994 | Mistry | 119/858 |
| 5,359,963 | 11/1994 | Jesse, Jr. et al. | 119/850 |

*Primary Examiner*—Michael J. Carone
*Assistant Examiner*—Judith A. Nelson
*Attorney, Agent, or Firm*—Mills Law Firm PLLC

[57] ABSTRACT

This invention is a multi-function pet collar having a fastener for attaching the collar about an animal's neck. The collar conceals an extensible cover which serves to protect the animal during inclement weather. This multi-layered cover includes an outer weather-proof layer of sheet plastic and an inner layer of cloth or thermal insulated material. The cover is secured about the animal's mid section with a tie strap that is passed through a waistband formed in the cover. The outer layer may also include light reflective strips positioned in predetermined locations to provide enhanced night visibility and protection from injury by motorists. The inner cloth layer may be provided with flea and parasite repellent strips to provide enhanced parasite protection while the animal is outdoors. The cover may be compactly folded and stored in a fabric pouch that is integrally formed with the collar. The fabric pouch is provided with velcro closures or other suitable fasteners to secure the cover within. The collar may also be provided with an electronic identification device containing ownership information to facilitate the return of a lost or injured pet.

16 Claims, 2 Drawing Sheets

MULTI-FUNCTION PET COLLAR

FIELD OF INVENTION

This invention relates to new and useful improvements in pet animal collars and more particularly to a multi-function collar including a waterproof cover, flea repelling means, light reflective means for night visibility, and electronic identification means.

BACKGROUND OF INVENTION

Providing protection and safety for pet animals when they are outdoors has been a difficult problem in the past. Due to an animal's natural inclinations and curiosity, pets can wander off during an unsupervised moment and become injured or lost. Such an animal may be subjected to severe weather conditions, exposure to parasites, being struck by a vehicle, particularly at night, or being stolen if of a particular breed or pedigree.

In recent years a variety of pet accessories have been invented to address these problems individually. More specifically, dog coats and sweaters have been developed for the purpose of protecting dogs from inclement weather. Other dog garments and collars have been developed to provide flea repelling strips at preselected places on the animal. Still other garments and harnesses have been devised to protect animals from serious night accidents. Finally, numerous collars have been invented which include identification devices containing ownership information to facilitate the return of the lost animal.

Concise Explanation of Prior Art

U.S. Pat. No. 5,060,458 to Cynthia L. Curtis discloses a protective coat for dogs, particularly designed for use by hunting dogs to provide safety through visibility.

U.S. Pat. No. 5,359,963 to Ronald C. Jess, Jr., et al. discloses a dog sweater for covering the body of a dog in inclement weather.

U.S. Pat. No. 3,141,443 to Joan M. Huey discloses a protective cover for dogs having means for holding a diaper for training purposes and also for protection of a female dog during mating season.

U.S. Pat. No. 5,003,756 to Joseph A. Mazzotta, Sr. discloses a dog coat having an inner surface provided with flea repelling strips.

U.S. Pat. No. Des. 337,864 to Marcella M. Cullinton, et al. discloses an ornamental design for an anti-flea coat for dogs.

U.S. Pat. No. 3,999,521 to Freddie Dave Puiello discloses a reflective safety harness for a quadruped animal such as a cat or a dog.

U.S. Pat. No. Des. 281,028 to Kenneth A. Nichols discloses an ornamental design for a fluorescent and reflecting safety vest for pets.

U.S. Pat. No. 5,355,839 to Rupal T. Mistry discloses a conventional animal collar including a microcassette enclosed in a weather-proof holder containing information concerning the owner of the animal.

Finally, U.S. Pat. No. 5,144,913 to Ryuzaburo Yasui discloses a collar enclosed for animals having copper sulfide absorbed therein to provide a deodorant effect on the animal's body smell.

BRIEF DESCRIPTION OF INVENTION

After much research and study into the above mentioned problems, the present invention has been developed to provide a multi-function pet collar which conceals a weather-proof cover, a flea and parasite repellent means, light reflective means for enhanced night visibility and an electronic identification device having ownership information contained therein.

The above is accomplished through the provision of a pet collar fabricated from a durable nylon or other suitable material having a conventional buckle type fastener in order to secure the collar about the animals neck. The collar conceals a multi-layered cover that is attached at one edge to the center line of the collar. The cover typically consists of two layers. An external, weather-proof layer overlays a cloth layer which is in direct contact with the animal. The inner surface of the cloth layer supports flea repelling means in the form of elongated strips or other suitable flea repelling means.

The external weather-proof layer may consist of an optically reflective material or may be provided with strips of reflective tape to enhance night visibility to protect the animal from injury by motorists.

The cover extends to the full length of the animal to provide maximum protection and may be secured in place with a tie strap about the animal's midsection.

In order to conceal the cover when not in use, it may be rolled up compactly and stored in a fabric pouch that is also attached to the collar.

An electronic identification device or other suitable identification means containing ownership information is also installed in the collar to facilitate the return of a lost animal to the owner.

In view of the above, it is an object of the present invention to provide a pet collar that conceals a cover which may be extended to the length of the animal.

Another object of the present invention is to provide a pet collar that conceals a weather-proof cover to protect the animal from inclement weather.

Another object of the present invention is to provide a pet collar concealing a cloth blanket layer to provide warmth and comfort when the animal is outdoors.

Another object of the present invention is to provide a pet collar concealing a cover consisting of reflective materials that will enhance night visibility and safety to the animal.

Another object of the present invention is to provide a pet collar concealing a cover which has an inner surface that will support flea repelling means in the form of elongated strips or other suitable means.

Another object of the present invention is to provide a pet collar whereon an electronic identification device is installed thereon.

Other objects and advantages of the present invention will become apparent and obvious from a study of the following description and the accompanying drawings which are merely illustrative of such invention.

DETAILED DESCRIPTION OF INVENTION

Figure 1:
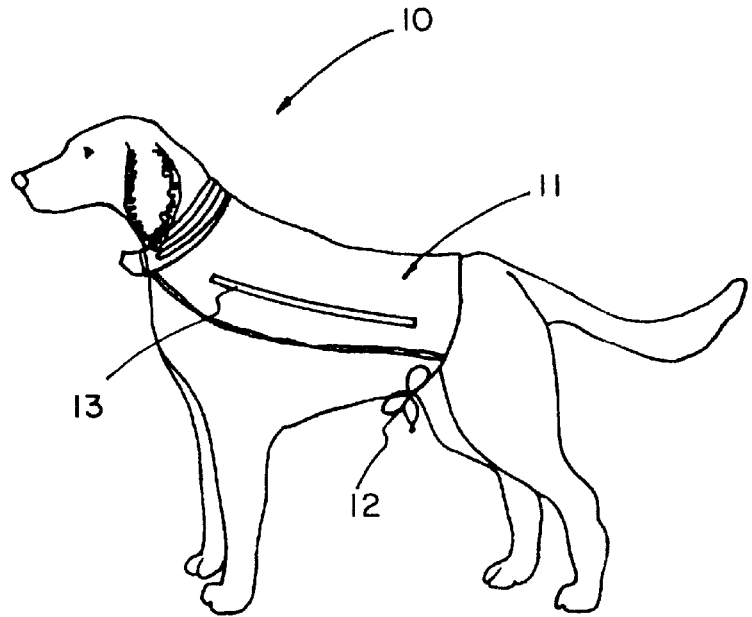
FIG. 1 is a perspective view of the multi-function pet collar of the present invention showing the multi-layer cover in position on a dog.

With further reference to the drawings, a multi-function pet collar in accordance with the present invention, indicated generally at 10, is illustrated in FIG. 1. In the embodiment shown, the pet collar 10 is shown with the multi-layer cover, indicated generally at 11, fully extended and secured in position by cover tie strap 12.

In this embodiment the extensible, multi-layer 11 cover includes a reflective strip 13 attached to its outer layer to impart enhanced night visibility to the animal.

Figure 2:
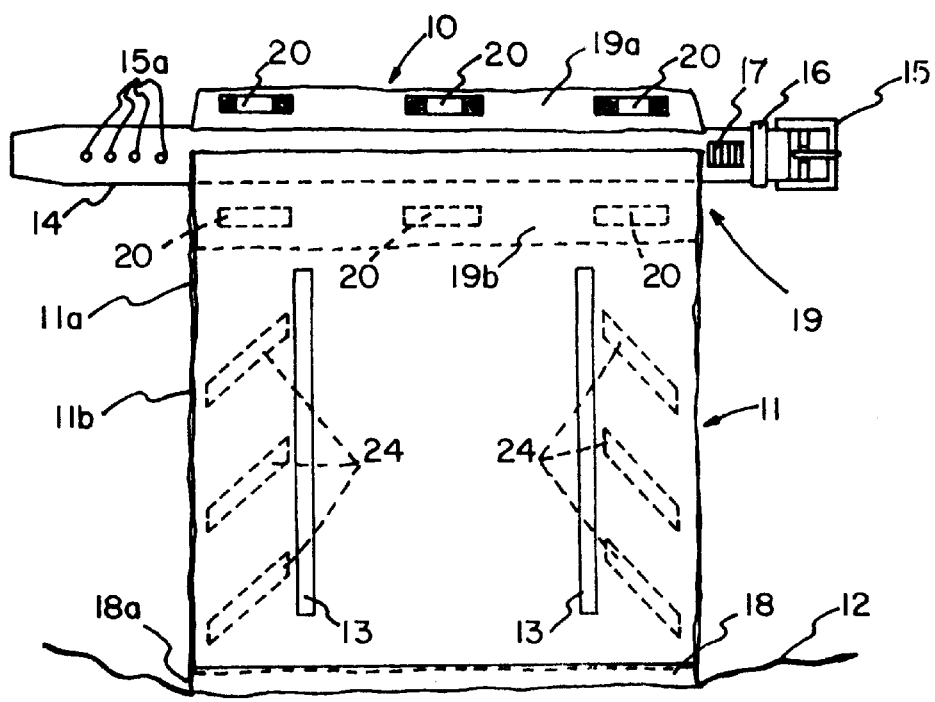
FIG. 2 is a plan view of the pet collar of the present invention showing the cover fully extended.

In the preferred embodiment of the present invention, shown in FIG. 2 collar belt 14 consists of a durable nylon fabric or other suitable material measuring approximately two inches in width. Collar belt 14 includes a conventional buckle type fastener 15 with buckle holes 15a and a belt loop 16 for securing collar belt 14 in position.

Collar belt 14 may also be provided with an electronic identification device 17 such as a scannable bar code or other suitable means containing ownership information for the animal. Electronic identification device 17 or other suitable identification device may be installed on collar belt 14 as shown in FIG. 2. Since such electronic identification devices which may contain ownership information are well known in the prior art, further detailed discussion of the same is deemed unnecessary.

It will be appreciated by referring to FIG. 2, that a multi-layer cover 11 is positioned at the approximate center line of collar belt 14 and attached thereto along one end. In the preferred embodiment of the present invention, cover 11 will consist of a weather-proof outer layer 11a overlaying a cloth layer 11b.

Outer layer 11a is fabricated from sheet plastic or other suitable materials to provide a moisture barrier in order to protect the animal from wet weather conditions.

Inner layer 11b may consist of nylon or other thermal insulated materials according to the degree of protection from inclement weather that is desired.

Cloth layer 11b may also be provided with a plurality of flea repellent strips 24, be impregnated with flea and tick repellents, or other flea and tick repellent means to provide protection from parasites as desired. Since such flea and tick repellents are well known in the prior art, further detailed discussion of the same is deemed unnecessary.

Outer layer 11a may be provided with a plurality of reflective tape strips 13 disposed in predetermined locations to impart enhanced night visibility to the animal thereby preventing injury by a motorist. Since such light reflective materials are well known in the prior art, further detailed discussion of the same is deemed unnecessary.

Cover 11 is provided with a waistband 18 formed by folding a predetermined length of cover 11 onto itself and stitching the same along its distal edge as indicated by phantom lines at the bottom of FIG. 2. Waistband 18 includes an elongated pocket 18a through which cover tie strap 12 may be passed and tied to secure cover 11 about the animals midsection.

Collar 10 is provided with a fabric pouch, indicated generally at 19, for concealing cover 11 when it is not in use. Pouch 19 consists of an upper flap 19a and a lower flap 19b (shown in phantom outline) as illustrated in FIG. 2.

Upper flap 19a is of an elongated, rectangular shape having a length that is slightly greater than the width of cover 11. Upper flap 19a is positioned in parallel spaced apart relation to that edge of cover 11 that is attached to collar belt 14. Upper flap 19a is attached to a top lateral edge of collar belt 14, as shown in FIG. 2.

Lower flap 19b of pouch 19 is also of an elongated, rectangular shape having a length that is slightly greater than the width of cover 11. Lower flap 19b is positioned in parallel, space apart relation to that edge of cover 11 that is attached to the center line of collar belt 14. Lower flap 19b is attached at a bottom lateral edge of collar belt 14 below cover 11 (shown in phantom outline).

As shown in FIG. 2, both upper flap 19a and lower flap 19b may be provided with a plurality of closures 20 such as hook and loop strips sold under the tradename "Velcro" or other suitable fasteners. Since such "Velcro" closures are well known in the prior art, further detailed discussion of the same is deemed unnecessary.

Figure 3:
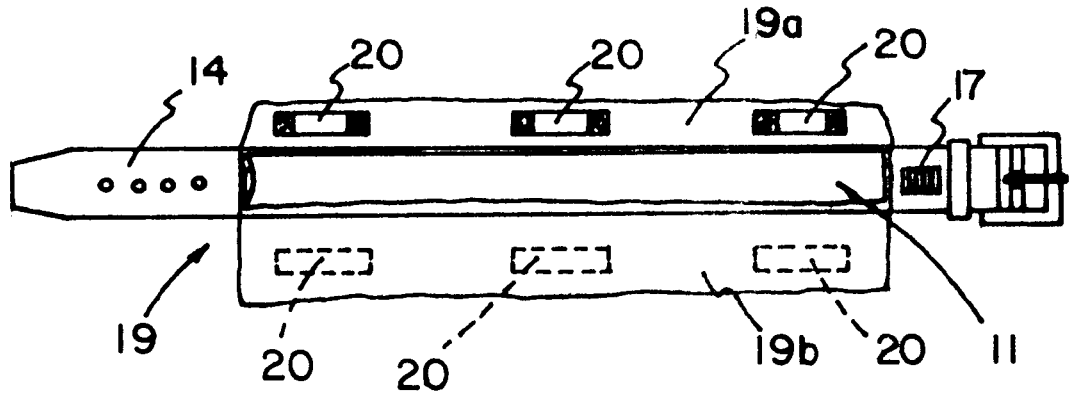
FIG. 3 is a plan view of the pet collar of the present invention showing the cover rolled up and disposed in the opened pouch.

Referring now to FIG. 3, it will be appreciated that cover 11 may be compactly folded and disposed between upper flap 19a and lower flap 19b of pouch 19. It will be observed that, the cooperating portions of "Velcro" closures 20 are depicted in phantom outline on lower flap 19b.

Figure 4:
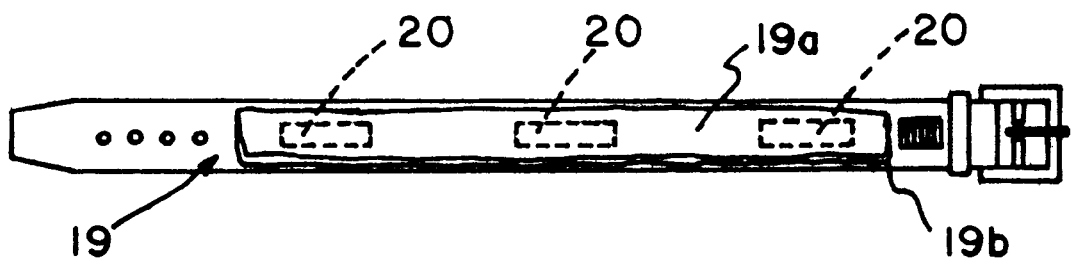
FIG. 4 is a plan view of the pet collar of the present invention showing the cover concealed in a closed pouch.

Referring now to FIG. 4, it can be seen that lower flap 19b may be folded in an upward direction over cover 11 and that upper flap 19a may be folded downwardly over lower flap 19b whereby the cooperating portions of "Velcro" closures 20 are positioned in their operative relationship securing cover 11 within pouch 19.

From the above it can be seen that the present invention provides a multi-function pet collar that conceals a thermal insulated, weather-proof cover. Further, the cover includes light reflective strips on an outer layer to provide enhanced night visibility for the animal and flea and tick repellents on an inner surface of the cover. Finally, the multi-function collar may be provided with an electronic identification device including ownership information to facilitate the return of a lost or injured animal.

The terms "upper", "lower", "side", "top", "bottom" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A multi-function animal collar comprising:
   a collar having a fastener for securing said collar about an animal's neck;
   a cover mounted on said collar, said cover being extensible to at least a portion of the length of said animal;
   a pouch having an upper flap portion and a lower flap portion attached to said collar whereby said cover may be compactly folded and stored within said pouch when not in use.

2. The multi-functional collar of claim 1 wherein said cover includes a plurality of layers.

3. The multi-functional collar of claim 2 wherein said cover includes an outer weather-proof layer and an inner cloth layer.

4. The multi-functional collar of claim 3 wherein said weather-proof layer is composed of sheet plastic.

5. The multi-functional collar of claim 4 wherein said weather-proof layer includes light reflecting material for enhanced night visibility.

6. The multi-functional collar of claim 4 wherein said weather-proof layer includes light reflective strips for enhanced night visibility.

7. The multi-functional collar of claim 3 wherein said inner cloth layer includes a parasite repellent.

8. The multi-functional collar of claim 7 wherein said parasite repellent is a plurality of parasite repellent strips on the inner surface of the cloth layer.

9. The multi-functional collar of claim 3 wherein said cloth layer is comprised of a thermal insulated material.

10. The multi-functional collar of claim 1 wherein a predetermined length of a distal edge of said cover is folded onto itself and sewn thereto forming a waistband, said waistband including a cover tie strap passing through an elongated pocket in said waistband whereby said tie strap may be utilized to secure said cover about the animal's midsection.

11. The multi-functional collar of claim 1 wherein said collar is fabricated from nylon cloth.

12. The multi-functional collar of claim 1 wherein said fastener comprises a conventional buckle.

13. The multi-functional collar of claim 1 wherein said upper flap portion and said lower flap portion are secured by means of a plurality of hook and loop closures.

14. The multi-functional collar of claim 1 wherein said pouch is fabricated from a synthetic cloth material.

15. The multi-functional collar of claim 1 wherein said collar includes an electronic identification.

16. The multi-functional collar of claim 15 wherein said electronic identification includes a means that can be scanned to obtain ownership information.

* * * * *